US006401040B1

(12) United States Patent
Conover

(10) Patent No.: US 6,401,040 B1
(45) Date of Patent: Jun. 4, 2002

(54) ANTENNA RECOMMENDATION MAP

(75) Inventor: Raymond A. Conover, Minneapolis, MN (US)

(73) Assignee: Conus Communications, St. Paul, MN (US)

( * ) Notice: Subject to any disclaimer, the term of this patent is extended or adjusted under 35 U.S.C. 154(b) by 0 days.

(21) Appl. No.: 09/347,968

(22) Filed: Jul. 6, 1999

(51) Int. Cl.[7] .......... G06F 19/00
(52) U.S. Cl. .......... 702/5
(58) Field of Search .......... 702/5; 703/2, 13

(56) References Cited

U.S. PATENT DOCUMENTS 5,574,466 A * 11/1996 Reed et al. .......... 342/359
5,828,960 A * 10/1998 Tang et al. .......... 455/446
6,115,580 A * 9/2000 Chuprun et al. .......... 455/1

OTHER PUBLICATIONS

Terrain–3D, web pages from Internet site http://206.27.208.202/3dterrain.html, no date provided.* 12/1999.*

* cited by examiner

*Primary Examiner*—Donald E. McElheny, Jr.
(74) *Attorney, Agent, or Firm*—Kinney & Lange

(57) ABSTRACT

A map for providing television antenna recommendations for a selected geographic area is disclosed. The map comprises multiple contours, a legend and a channel list. Each contour corresponds to a type of antenna. The legend associates each contour with a type of antenna. The channel list includes television channels that were used in generating the map contours. A preferred method for generating the maps of the present invention uses terrain data representing the topography of a geographic area. A set of television channels being broadcast in the geographic area is identified. A set of signal characteristics is calculated based on the identified set of television channels and the terrain data. The calculated signal characteristics include signal strength of at least one television channel at various points in the geographic area, and include multi-path characteristics and signal blockage characteristics. The preferred method generates a map of the geographic area, wherein the map includes multiple contours based on the calculated set of signal characteristics.

29 Claims, 6 Drawing Sheets

(2 of 6 Drawing Sheet(s) Filed in Color)

CONTOUR DEFINITIONS 102
100A
Cleveland, OH TV Antenna Selector Map
CANADA
LAKE
ERIE
114
104
106
108
112A
112B
112C
112D
112E
112F
112G
112H
110
116A
116B
116C
116D
116E
116F
116G
116H

CONTOUR DEFINITIONS

AREA SPECIAL ALGORITHM

ANTENNA RECOMMENDATION MAP

CROSS-REFERENCE TO RELATED APPLICATION (S)

None.

BACKGROUND OF THE INVENTION

The present invention relates to a system and method for providing television antenna recommendations. In particular, the invention relates to a system and method for generating a contour map of a television market that provides television antenna recommendations.

Existing geographical maps that show television signal characteristics are merely "coverage" maps, which typically show television signal strengths for only a single channel. Most such maps typically take into account the effect of the terrain on television signal propagation, but do not include the effects caused by buildings or similar structures. Such existing maps also do not provide recommendations regarding which types of antennas are likely to work best at various points on the maps.

Antenna recommendations are particularly important to purchasers of direct broadcast satellite (DBS) systems because such systems often require the customer to use an antenna to receive local programming. Studies have indicated that a large percentage of potential purchasers have not purchased satellite-based television systems because no satisfactory solutions were presented to them regarding how to receive local channels.

It would be desirable to provide a user-friendly map that assists purchasers in identifying the correct antenna for their location and situation. It would also be desirable to take multiple channels into account in generating each map to ensure adequate reception of all channels with the recommended antennas. Taking into account the effects of buildings and other large structures on television signal propagation would be desirable to increase the accuracy of signal strength calculations and antenna recommendations. Further, the identification of an area special region, which is an area where a single directional antenna can not be used without a means of rotation, would be a useful feature of an antenna recommendation map.

BRIEF SUMMARY OF THE INVENTION

A map for providing television antenna recommendations for a selected geographic area is disclosed. The map comprises multiple contours, a legend and a channel list. Each contour corresponds to a type of antenna. The legend associates each contour with a type of antenna. The channel list includes television channels that were used in generating the map contours.

In a preferred embodiment, one of the map contours corresponds to an area special region, indicating an area where a single directional antenna can not be used without a means of rotation. Also in a preferred embodiment, the invention includes an antenna selector guide attached to or otherwise in close association with the map. The antenna selector guide includes conditional antenna recommendations, wherein the conditions are based at least in part on details not included in the map.

A preferred method for generating the maps of the present invention is also disclosed. The method uses terrain data representing the topography of a geographic area. A set of television channels being broadcast in the geographic area is identified. A set of signal characteristics is calculated based on the identified set of television channels and the terrain data. The preferred method generates a map of the geographic area, wherein the map includes multiple contours based on the calculated set of signal characteristics. A map legend that associates each contour with a recommended antenna type is provided.

In an alternative preferred embodiment, the method of the present invention supplements the terrain data with structure data representing man-made structures such as buildings, grain elevators and tanks, so that the structures are essentially made part of the terrain. Also in a preferred embodiment, the calculated signal characteristics include the weakest signal strength of all listed channels at various points in the geographic area, and include multi-path characteristics and signal blockage characteristics.

The user-friendly maps generated in accordance with the techniques of the present invention assist purchasers in identifying the correct antenna for their location and situation. The invention takes multiple channels into account in generating each map to ensure adequate reception of all channels with the recommended antennas. The invention takes into account the effects of buildings and other large structures on television signal propagation, which increases the accuracy of signal strength calculations and antenna recommendations. Further, the maps of the present invention identify area special regions, which are areas where a single directional antenna can not be used without a rotation means.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION

I. Introduction

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a method for generating maps that provide antenna recommendations to prospective purchasers of television antennas. The generated maps are preferably located in retail stores where antenna products are sold. The maps may be printed out and displayed at various locations in a store. The type of antenna recommended by a generated map depends on the purchaser's location within the relevant map. The maps include colored contours, with each contour corresponding to a different type of antenna (see FIGS. 1 and 2). The colored contours are preferably substantially transparent so that the underlying map details may be seen, and users may more easily identify their homes. It is also possible to implement the present invention using different forms of cross-hatching to represent the various contours, although the use of substantially transparent colored contours is preferred.

In the present invention, antennas are broadly classified as either outdoor or indoor. Under the outdoor classification, antennas are further classified as either directional or multidirectional. Multidirectional antennas typically receive equally well from all directions, whereas directional antennas are designed to receive from a single direction. Each outdoor directional antenna and outdoor multidirectional antenna has a size classification of small, medium or large. Typically, the larger the antenna, the better the signal reception. The maps generated by the method of the present invention provide recommendations only for outdoor antennas. As will be discussed in further detail below, however, indoor antennas may be used in certain higher signal areas.

The maps of the present invention also provide recommendations in certain special cases for an area special antenna. An area special region is one in which a single directional antenna can not be used because the transmitting stations are too far apart for the directional antenna to be aimed correctly. Several manufacturers offer area special antennas to solve reception problems in such areas.

In addition to working for standard analog NTSC television broadcasts, the antenna recommendations provided by the maps of the present invention also work for any satellite platform, HDTV and all terrestrial digital broadcasts.

II. Appearance of Maps

Figure 1:
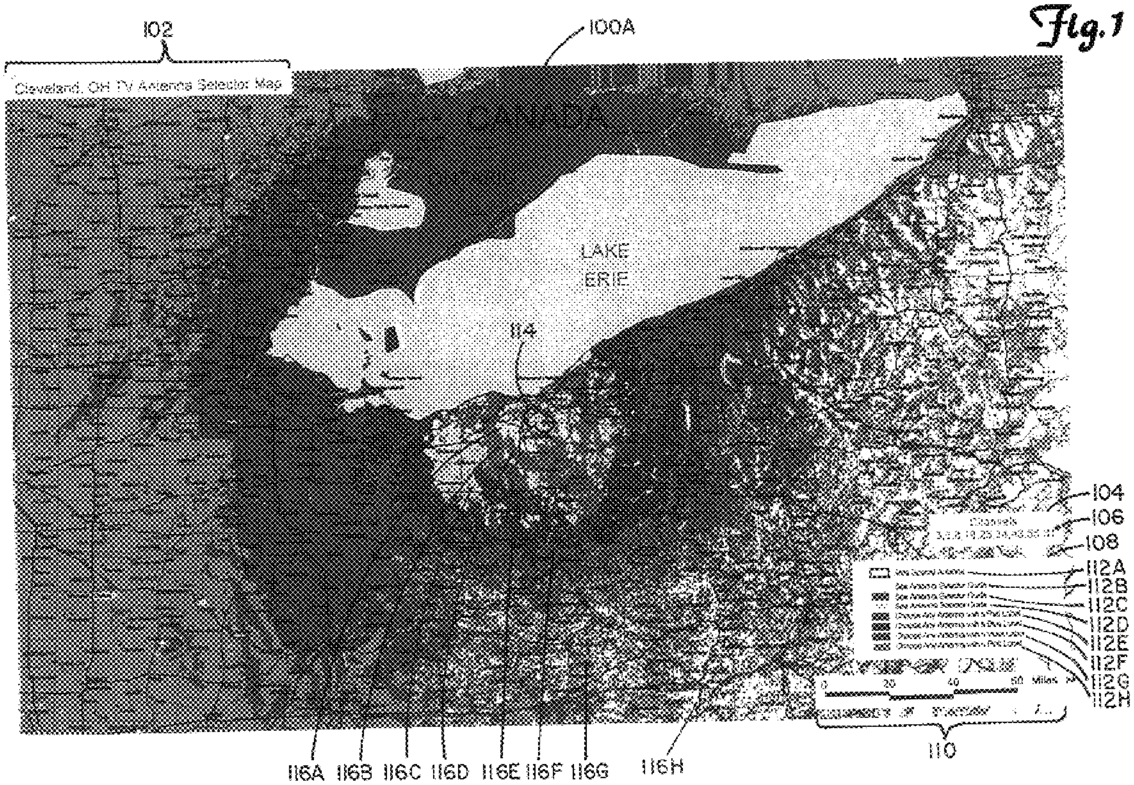
FIG. 1 shows a preferred embodiment of an antenna recommendation map with colored contours.

FIG. 1 shows map 100A, which was generated using the techniques ol the present invention. Map 100A includes title region 102, channel list 104, channel marker 106, legend 108, distance indicator 110, legend entries 112A–112H, area special contour 114, yellow contour 116A, green contour 116B, light green contour 116C, red contour 116D, blue contour 116E, violet contour 116F, pink contour 116G and white contour 116H. When referring to a specific map in the present invention, a letter is appended to the reference number "100" to identify the specific map, whereas general references to all of maps of the present invention use the reference number "100" without the appended letter. This same referencing technique is also used for other invention elements including contours "116".

Each map 100 in the present invention covers a particular television market. The market covered by a map 100 is listed in title region 102. For map 100A shown in FIG. 1, title region 102 includes the text "Cleveland, Ohio TV Antenna Selector Map", so the market that is covered is Cleveland, Ohio. For each television market that is to be mapped, a list of television channels in that market is identified. The identified television channels are listed in channel list 104. Also for each market, one or more base maps are obtained. A base map is a commercially available map that shows underlying details of a map 100, without the colored contours. The base maps for a particular market may vary in resolution and amount of detail. Base maps preferably include all bodies of water, all roads, state names, county names and city names. Base maps may also include larger airports which may be represented by airplane icons.

Various characteristics regarding the channels listed in channel list 104 are used in generating the map contours 116. The location and color of the contours 116 are determined based on numerous factors including predicted signal strengths of the television channels included in channel list 104, signal blockage caused by buildings and terrain, and multi-path or ghosting effects. The generation of the map contours 116 using the above factors and others is discussed below in section III (Generation of Map Contours).

Channel list 104 for a map 100 need not include all channels that are available in the market. Channels may be rejected based on several variables, such as stations that transmit unusually low power compared to other stations in a market, or stations that have an unusually low antenna height. Similarly, stations that are isolated, and not within a specified area, such as a twenty mile diameter circle, may be rejected. If a station is outside the specified area, a second map may be created that includes the station.

Not all channels that are included in channel list 104 are necessarily used in generating the map contours 116. If a channel listed in channel list 104 was not used in generating the map contours 116, a channel marker 106, which is shown as an asterisk in FIG. 1, is preferably placed adjacent to the channel to so indicate. In order to be included in channel list 104, a channel with a channel marker 106 should preferably be substantially co-located with one of the other listed stations so that, if an antenna were pointed in the direction of the transmitting stations, the channel with the channel marker 106 would be received, but likely at reduced quality. Thus, if there is a channel marker 106 by a channel, it tends to indicate that an antenna will work for that channel, but it will not work as well as for the other listed channels. An example of a channel that might be included in a map but not used in the contour calculations would be channel 17 in the Minneapolis, Minn. area. Channel 17 transmits less than the normal amount of power for a UHF station. Therefore, its performance, particularly in rural areas, is poorer than other stations. If channel 17 were used in the map calculations, the map would essentially become a map solely for channel 17, and it would greatly over-specify an antenna for the majority of channels in channel list 104.

Each map 100 includes a legend 108 with a plurality of legend entries 112A–112H. The legend entries 112 for map 100A are as follows:

| | |
|---|---|
| Area special boundary box | Area Special Antenna |
| Yellow box | See Antenna Selector Guide |
| Green box | See Antenna Selector Guide |
| Light green box | See Antenna Selector Guide |
| Red box | Choose Any Antenna with a Red Label |
| Blue box | Choose Any Antenna with a Blue Label |
| Violet box | Choose Any Antenna with a Violet Label |
| Pink box | Choose Any Antenna with a Pink Label |

Legend entries 112 include a small colored box and an antenna recommendation. The color of the colored box in each legend entry 112 corresponds to the color of one of the colored contours 116. A prospective antenna purchaser locates his or her house on the appropriate map 100 for the purchaser's market. The purchaser then identifies a legend entry 112 having a colored box with the same color as the contour 116 covering the purchaser's house. For instance, assuming a purchaser's house falls within a Red contour 116D, the purchaser would see from legend entry 112H that the purchaser should "Choose Any Antenna with a Red Label". Preferably, the packaging for antenna products includes appropriate color-coded symbols corresponding to the colors of contours 116 and legend entries 112, so that purchasers can easily find and purchase the appropriate antennas. Alternatively, the appropriate antenna type for each contour 116 may be written directly on the corresponding legend entry 112 for the contour. In such alternative embodiments, legend 108 may appear something like the following:

| | |
|---|---|
| Area special boundary box | Area Special Antenna |
| Yellow box | See Antenna Selector Guide |
| Green box | See Antenna Selector Guide |
| Light green box | See Antenna Selector Guide |
| Red box | Medium Size Directional Antenna |
| Blue box | Medium Size Directional Antenna with Pre-Amp |
| Violet box | Large Size Directional Antenna with Pre-Amp |
| Pink box | Large Size Directional Antenna with Pre-Amp |

As can be seen from this legend, antenna types are explicitly listed for the red, blue, violet and pink contours 116. For the area special contour 114, an area special antenna is recommended. The area special contour 114 defines an area where a single directional antenna can not be used without a means of rotation because the transmitting stations are too far apart for the antenna to be aimed correctly. Outside the area defined by area special contour 114, a single directional antenna can be used because the angular separation is acceptable. Several manufacturers offer area special antennas to solve reception problems in such areas.

For the yellow, green and light green contours 116, legend 108 refers the purchaser to an "Antenna Selector Guide". The antenna selector guide 120 (shown in FIG. 3) is preferably a document that includes questions about specific neighborhoods—detail levels that are too small to be on a map. Alternatively, the antenna selector guide 120 may consist of a plurality of television displays, computer displays, etc., that provide the necessary information. The content of the antenna selector guide 120 is preferably the same for all purchasers, regardless of their television market. The antenna selector guide 120 is used because not all buildings can be taken into account in calculating the map (i.e., not all buildings are in the databases used to generate the contours 116), so purchasers are specifically asked questions regarding their neighborhoods.

In a preferred embodiment, the antenna selector guide 120 includes the question: "Are there any buildings, steeples, towers or other structures taller than four stories within four blocks of your location?". If the answer to the question is "no", the antenna selector guide 120 recommends that the consumer use an antenna with a label matching the color for the contour 116 in which the consumer lives. Thus, if the consumer lives in an area marked by a yellow contour, the consumer should use an antenna marked with a yellow label (i.e., a small rooftop mounted multidirectional antenna). If the consumer lives in an area marked by a green contour, the consumer should use an antenna marked with a green label (i.e., a medium rooftop mounted multidirectional antenna). And if the consumer lives in an area marked by a light green contour, the consumer should use an antenna marked with a light green symbol (i.e., a large rooftop mounted multidirectional antenna). If the answer to the antenna selector guide 120 question is "yes", the antenna selector guide 120 recommends that the consumer use an antenna with a red label (i.e., a medium rooftop mounted directional).

The antenna selector guide 120 also preferably provides special notes that may apply to certain customers, such as the use of indoor antennas, "ghosting" effects, placing antennas in an attic, use of an amplifier in conjunction with an antenna, and "area special" regions. One note regarding area special regions that is preferably included in the antenna selector guide 120 is that, if a location within the area special contour 114 is in a yellow contour 116A, green contour 116B or a light green contour 116C, the antenna recommended for these contours may be used. If, however, the location within the area special contour 114 is in a contour other than yellow, green or light green, an "area special" antenna is recommended.

Figure 2:
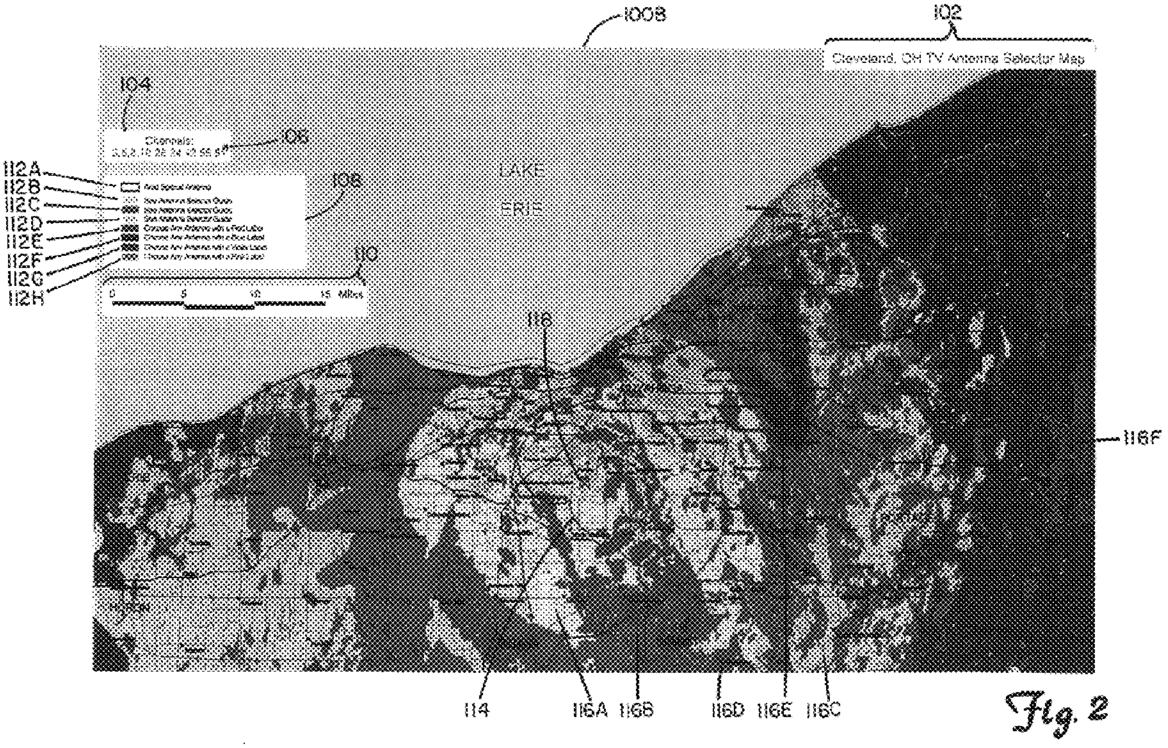
FIG. 2 shows a preferred embodiment of a close-up view of a portion of the antenna recommendation map shown in FIG. 1.

FIG. 2 shows map 100B, which is a close up view of a portion of map 100A. For each television market, multiple maps 100 are preferably provided to the retail stores, with the maps including different levels of detail. If a purchaser is unable to locate his or her home on map 100A, or if a purchaser's house is close to a boundary between two contours 116 on map 100A and can not determine which contour the purchaser falls into, the purchaser may consult map 100B. Map 100B provides additional detail that facilitates identification of purchasers' homes. Higher resolution maps like map 100B are preferably centered on the city for which the map is named, whereas lower resolution maps like map 100A are preferably centered on the transmitter location, or, for multiple transmitter locations, on the geographic center of the transmitter locations. Other centering may be employed in order to enhance the utility of the map.

A tower icon 118 is placed on map 100B to represent the location of the television transmitters for the channels in channel list 104. One tower icon 118 is employed for all transmitters unless the separation between transmitters is 2 miles or greater, in which case an additional tower icon 118 is employed for each such transmitter or group of transmitters. The distance scale for each map 100 is provided by distance indicator 110.

Figure 3:
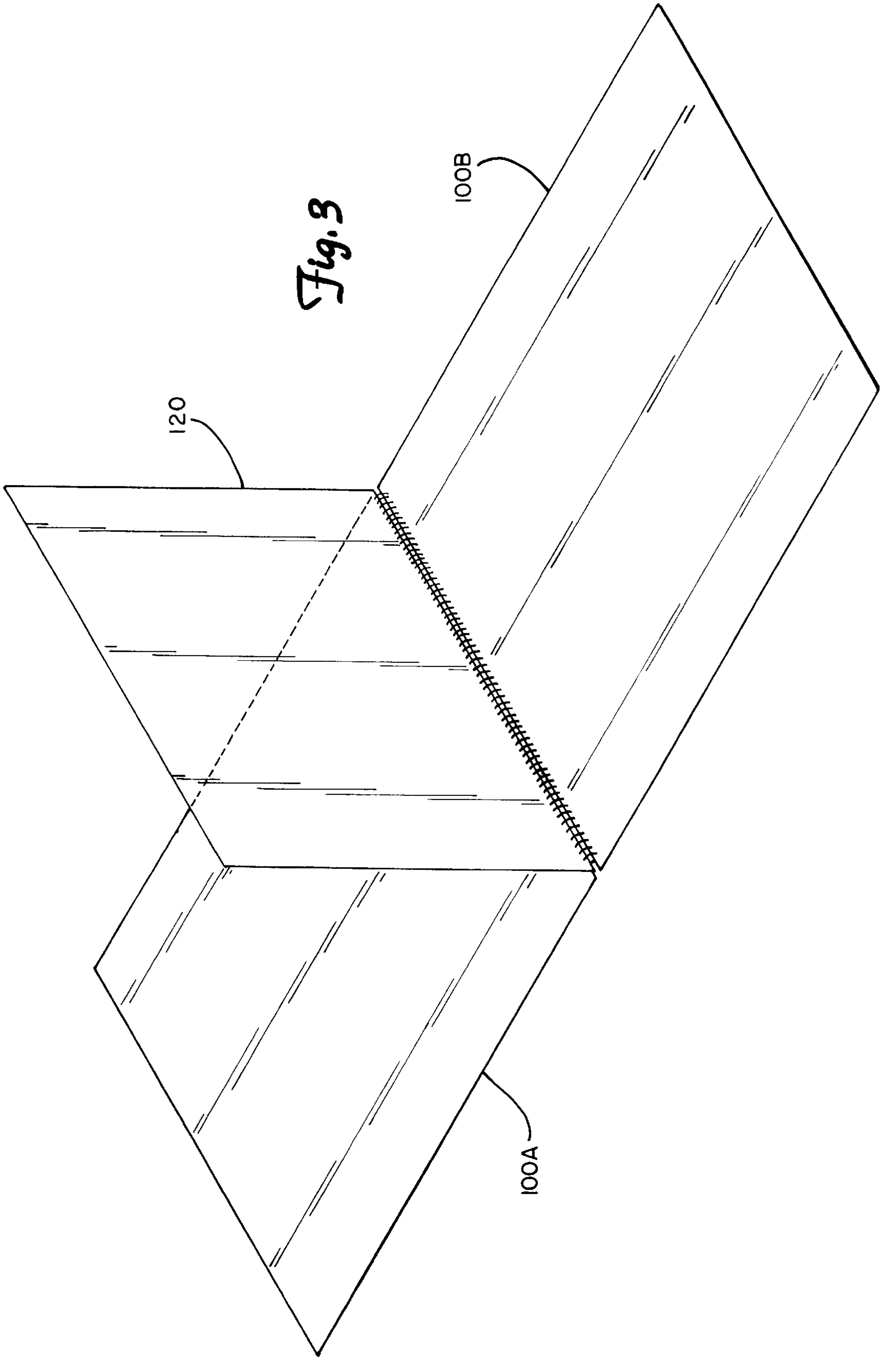
FIG. 3 shows a perspective view of a preferred layout of antenna recommendation maps and an antenna selector guide.

FIG. 3 shows a perspective view of map 100A, map 100B and antenna selector guide 120, which are arranged in a manner that facilitates ease of use and identification of appropriate antennas. Map 100A, map 100B and antenna selector guide 120 are connected together at one of their edges by a fastening device, such as a spiral ring. Antenna selector guide 120 preferably includes identical content on both of its sides. During use, map 100A and map 100B are laid flat on an appropriate surface (as shown), and antenna selector guide 120 is flipped over on the map 100 that is not currently being viewed.

III. Generation of Map Contours

A. Signal Strength Calculations

Several factors are taken into account in generating each pixel of a map 100. The factors include signal strengths, antenna heights, geographic location the terrain including large buildings, broadcast frequencies and the power of broadcast stations. The factors are taken into account through several algorithms discussed below. The algorithms may be implemented with a general purpose computer or specialized hardware and software. The algorithms can be computationally intensive so a high performance computer is desirable.

The Longley-Rice algorithm is used to predict signal strength for each channel in channel list 104 at every pixel on map 100. Longley-Rice is an industry standard technique for predicting signal strength. Longley-Rice examines the path between the transmit antennas (represented by tower icon 118) and each pixel on map 100 to determine signal strength at each pixel. The input parameters for the Longley-Rice algorithm include receive antenna height, transmit antenna frequency, transmit antenna height, transmit antenna gain in the path being analyzed, and the terrain profile along the path being analyzed. It is assumed that the receive antennas are rooftop mounted at a height of 30 feet above ground. The transmit antenna frequency, transmit antenna height and transmit antenna gain are derived from the FCC Master File, which is a publicly available database provided by the Federal Communications Commission.

The terrain data for the Longley-Rice algorithm is preferably obtained from the United States Geologic Survey Database (the "terrain" database), which is a publicly available database that provides the topography of the land in the United States. In a preferred embodiment, the terrain database is augmented with data from one or more commercially available object databases that list various structures, including buildings, water towers and communication towers. By augmenting the terrain database with buildings and other structures from an object database, buildings are essentially made part of the terrain. The augmentation provides for a more accurate representation of the obstructions encountered by broadcast television signals. The terrain database augmentation increases the terrain height by the height of the added structure. If actual size information regarding the width of a structure is given by the object database, that size information is used in the augmentation. If such information is not provided, it is assumed that the width of an object is two times its height. In a preferred embodiment, the terrain database is not augmented with all structures in the object database, but only the following structures:

1. Buildings taller than 40 feet.
2. Elevators taller than 40 feet.
3. Tanks taller than 40 feet.

B. Initial Identification Of Contours

Figure 4:
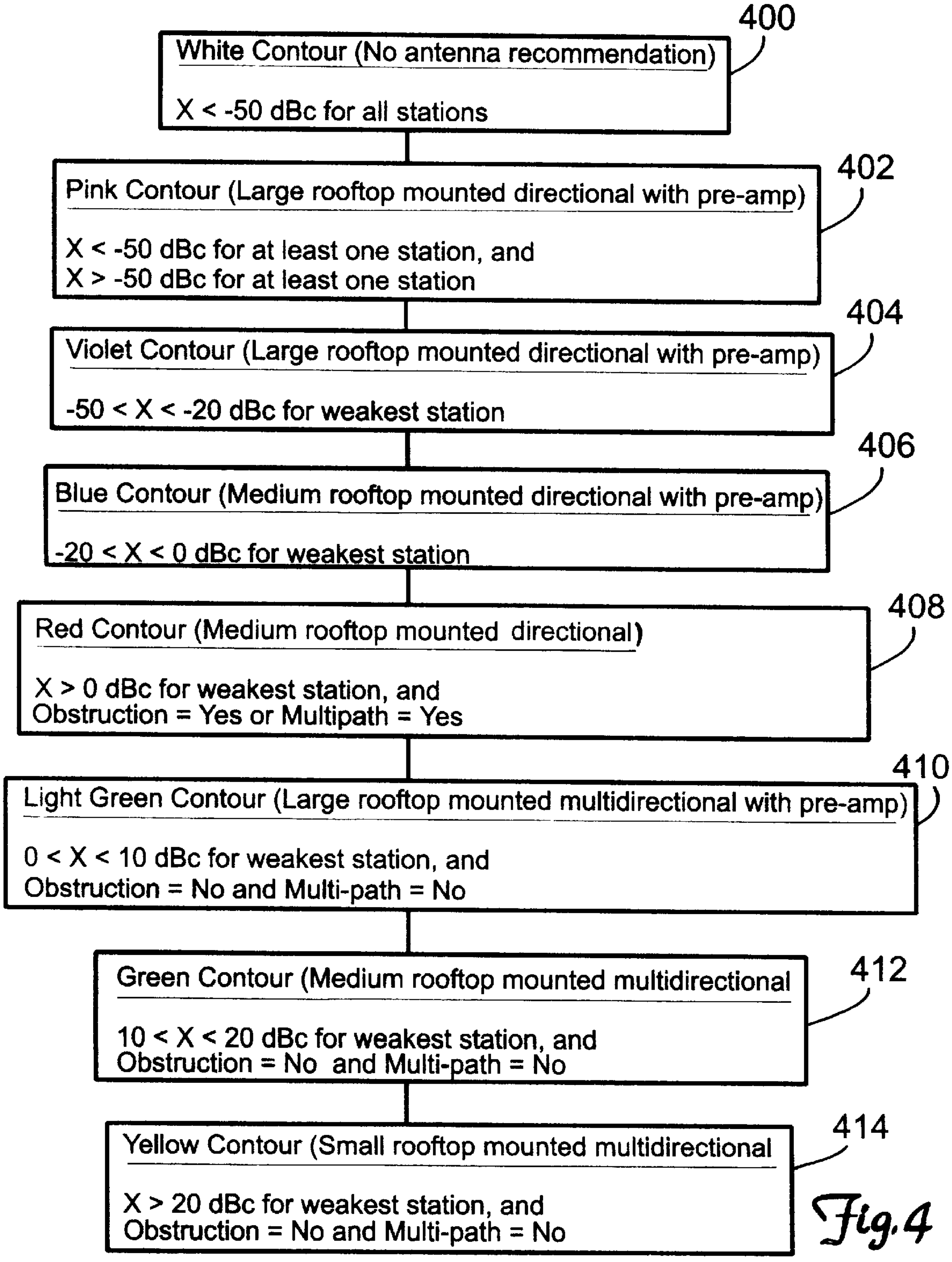
FIG. 4 shows a summary of preferred contour definitions.

After the signal strength at each pixel is calculated using the Longley-Rice algorithm, an initial identification of contours 116 may be determined. FIG. 4 shows preferred definitions for each of the contours 116, as well as a recommended antenna type for each contour. Each contour definition in FIG. 4 includes a range of signal strengths. The letter "X" in FIG. 4 denotes signal strength. The letters "dBc" preceded by a positive or negative integer indicate a number of decibels above or below the FCC defined city grade field strength for a channel. For each pixel of map 100, the calculated signal strengths at that pixel are compared to the range of signal strengths in each contour definition, and the appropriate initial contour 116 for the pixel is identified. When comparing calculated signal strengths to the contour definitions shown in FIG. 4, the comparisons need not be made in the order shown in FIG. 4, but may be tested in any suitable order.

White contours 116H in map 100 represent FCC defined "no service" areas for all channels in channel list 104. White contours 116H are defined as no channel being above −50 dBc (i.e., X<−50 dBc for all stations). (Block 400). White areas in maps 100 indicate areas that are not suitable for television antennas. These contours are generally in very rural areas where the signal is too weak for adequate reception. A professionally installed tall tower, satellite delivered network stations, or cable is recommended in these cases.

Pink contours 116G include pixels with one or more stations on the channel list 104 that would fall into a white contour 116H, but one or more other stations on the channel list 104 are receivable (i.e., above −50 dBc). (Block 402). In pink contours 116G, a large rooftop mounted directional antenna with a pre-amp is recommended to receive at least one station.

Violet contours 116F include pixels with a signal strength ranging from −50 dBc to −20 dBc for the weakest station on the channel list 104. (Block 404). The weakest channel is taken into account because, if the desired quality objective is satisfied for the weakest channel, it should also be satisfied for the stronger channels. The weakest channel will vary across a map because different channels propagate differently. For example, in one location, channel 23 might be the weakest, and in another location, channel 2 might be the weakest. In violet contours 116F, a large rooftop mounted directional antenna with pre-amp is recommended to provide service on all stations in the channel list 104.

Blue contours 116E include pixels with a signal strength in the range of −20 dBc to 0 dBc for the weakest station on the channel list 104. (Block 406). In blue contours 116E, a medium size rooftop mounted directional antenna with pre-amp is recommended.

Red contours 116D include any pixels not included in a white, pink, violet or blue contour 116 that are obstructed by terrain or buildings, or have multi-path interference. (Block 408). Methods for identifying areas that are obstructed or that have multi-path interference are discussed below. For areas that fall within a red contour 116D, a medium rooftop mounted directional antenna is recommended.

Light green contours 116C include pixels with a signal strength that ranges from 0 dBc to 10 dBc for the weakest station on the channel list 104, and that (1) are not terrain or building obstructed, and (2) do not have multi-path interference. (Block 410). In light green contour areas 116C, a large rooftop mounted multidirectional antenna with pre-amp is initially recommended. However, legend 108 in map 100 recommends that consumers consult the antenna selector guide 120, which provides additional questions regarding the consumer's neighborhood. Depending on the answers to the questions, the recommended antenna may change to the antenna recommended for the red contour 116D. In a preferred embodiment, the antenna selector guide 120 asks the question: "Are there any buildings, steeples, towers or other structures taller than four stories within four blocks of your location?". If the answer to the question is "no", the antenna selector guide 120 recommends that the consumer use an antenna with a label matching the color for the contour 116 in which the consumer lives (i.e., the initial recommendation). If the answer to the antenna selector guide 120 question is "yes", the antenna selector guide 120 recommends that the consumer use an antenna corresponding to a red contour 116 (i.e., a medium rooftop mounted directional).

Green contours 116B include pixels with signal strengths in the range of 10 dBc to 20 dBc for the weakest station on the channel list 104, and that (1) are not terrain or building obstructed, and (2) do not have multi-path interference. (Block 412). In green contour areas 116B, a medium rooftop mounted multidirectional antenna is initially recommended. However, as with light green contour areas 116C, legend 108 in map 100 recommends that consumers consult the antenna selector guide 120 for green contour areas 116B. Depending on the answers to the questions, the recommended antenna may change to the antenna recommended for the red contour 116D.

Yellow contours 116A include pixels with signal strengths above the 20 dBc level for the weakest station on channel list 104, and that (1) are not terrain or building obstructed, and (2) do not have multi-path interference. (Block 414). In yellow contour areas 116A, a small rooftop mounted multidirectional antenna is initially recommended. However, as with light green and green contour areas 116, legend 108 in map 100 recommends that consumers consult the antenna selector guide 120 for yellow contour areas 116A. Depending on the answers to the questions, the recommended antenna may change to the antenna recommended for the red contour 116D.

Yellow and green contours 116 are areas where indoor antennas are most likely to work well, or where outdoor antennas placed in an attic may work well. Reception of television signals in an attic can be very difficult due to interference from other electrical devices. Building construction techniques can also hinder the entrance of the television signal or cause reflection of the signal that leads to ghosting. In a house with aluminum siding, signal loss can be up to 100 percent. Amplifiers are desirable in order to make up for signal losses caused by things such as building construction techniques. Notes regarding indoor antennas and placement of antennas in an attic may be included in the antenna selector guide 120, or on the map 100.

After the initial identification of contours is made, several calculations and algorithms are performed to determine signal blockage, multi-path or ghosting effects and an area special region. Depending upon the outcome of the calculations, the color of pixels may be changed.

C. Identification of Obstructed Pixels in Yellow, Green and Light Green Contours One factor that may change the color of a pixel is signal blockage. When a receiving antenna is positioned such that the curvature of the earth or a structure such as a building causes the antenna to not have a direct view of a transmitting antenna, the received signal is weakened. The presence of signal blockage is preferably determined by using a trigonometric calculation. The trigonometric calculation uses data from the terrain database and object database and determines whether there is a clear path between the transmitters and each pixel (i.e., each potential location of a receive antenna), or whether the path is blocked by terrain or other obstructions. The trigonometric calculation is made for all stations in channel list 104. If any station is blocked at a particular pixel location, that location is treated as a blocked site. In a preferred embodiment, signal blockage is only calculated for pixels that are in yellow, green or light green contours 116. If the pixel is blocked, it is changed to red.

D. Compatibility with Digital Television Transmissions

Generally speaking, digital television signals are easier to receive than analog signals and normally would not need to be considered in making a map that was useable for both analog and digital broadcasts. To one skilled in the art of television transmission it will be apparent that some terrain and channel combinations may challenge that assumption. To assure the map's usefulness for digital television, the highest frequency digital channel authorized by the FCC that is colocated with a map analog channel may be included in map channel list 104. The digital channel performance would be calculated using industry standard digital planning factors.

E. Multi-path Algorithm Applied to Structures in Yellow, Green and Light Green Contours Multi-path or ghosting effects are also preferably taken into account in generating map contours 116. "Ghosting" is the blurring of a television image that results when a television signal arrives at a receive antenna via more than one path, typically due to reflection of the television signal by tall structures such as high rise buildings. Low areas in a neighborhood are especially susceptible to ghosting. If ghosting is caused by a single structure that creates one distinct ghost image, a medium or large multidirectional antenna may be useful with careful positioning to eliminate the reflected signal. However, the antenna may require different positioning for each channel. Directional antennas are the most ghost resistant antennas since they "see" in only one direction and have a tendency not to see the reflected ghost signal. The further away from structures the antenna is located, the less likely a ghosting problem will occur.

Structures that typically cause ghosting include nearby buildings that are higher than the receive antenna or that block the receive antenna's view of a television station's transmitter, including the following: church steeples, apartment/condominium buildings, school buildings, water towers, industrial buildings, office buildings, warehouses, large communications/radio/television towers, athletic field lighting towers and high tension power lines and towers. Trees and foliage usually do not cause a ghosting problem, but in some cases may absorb television signals and reduce their strength. Other structures that typically do not cause ghosting problems include other homes, wooden buildings that are not taller than the antenna location, street light or utility poles, cellular or PCS poles that are a single pole no higher than treetops, and ham radio antennas or other television antennas.

Figure 5:
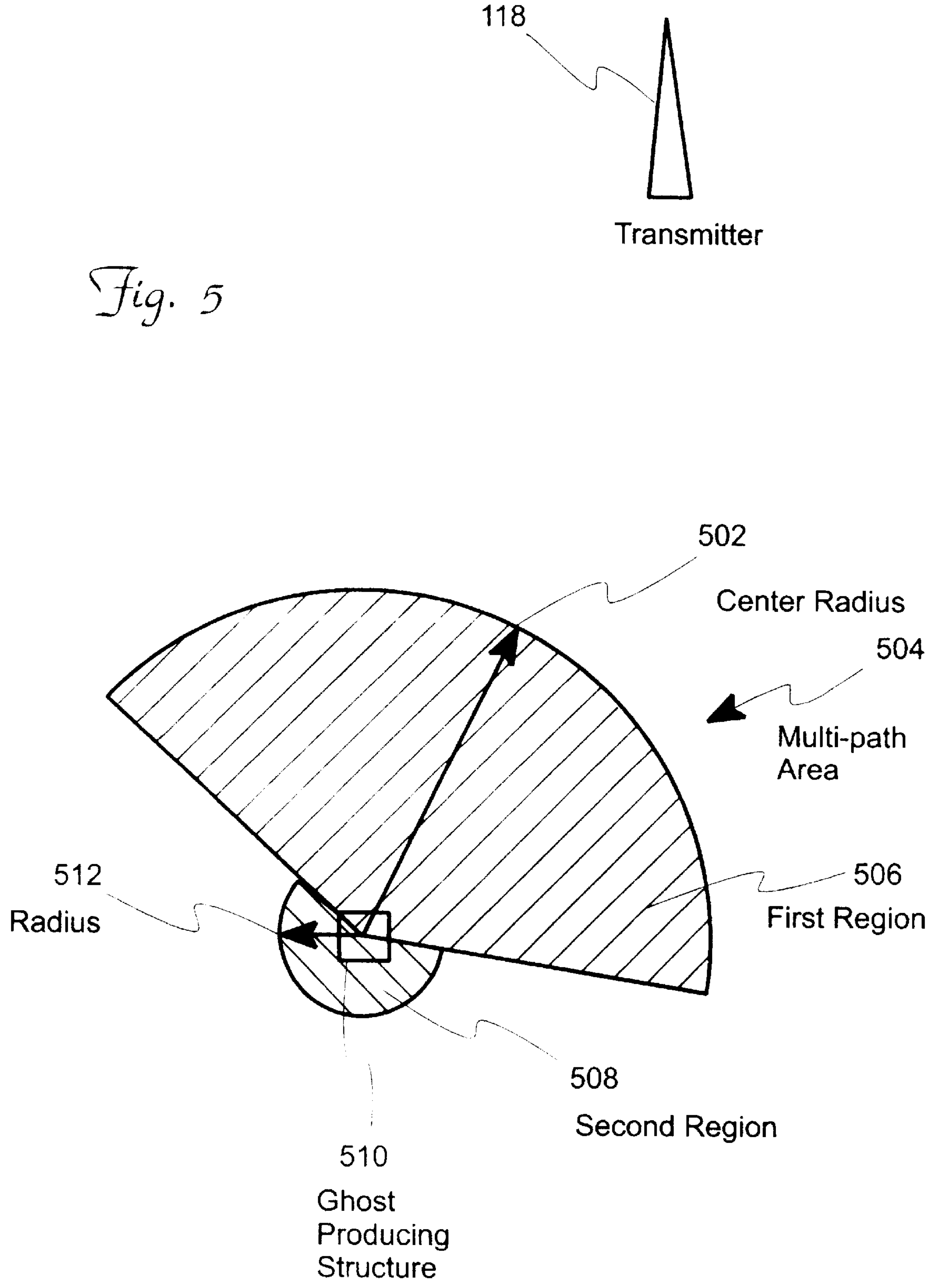
FIG. 5 shows a diagram of a multi-path area.

Ghosting effects are taken into account in generating contours 116 through the use of a multi-path algorithm. FIG. 5 shows a preferred embodiment of a multi-path area 504, which was calculated using a multi-path algorithm. The multi-path algorithm is preferably applied to ghost producing structures in light green, green and yellow contours 116. In the pixel areas where the multi-path algorithm indicates that ghosting may occur (i.e., a multi-path area 504), the pixels are colored red.

In a preferred embodiment, the multi-path algorithm defines the multi-path area 504 as including two regions—first region 506 and second region 508, which are both shaded with diagonal cross-hatching. The multi-path area definition was derived from empirical data obtained by measuring signal reflections from various structures and characterizing the signal reflections in terms of the area they affect. First region 506 is defined by the interior of a partial circle whose center radius 502 extends from the ghost producing structure 510 towards the transmitter 118 a distance of 13 times the height of structure 510. The partial circle extends 70 degrees on each side of center radius 502. Second region 508 is defined by the interior of a partial circle centered on structure 510 with a radius 512 of two times the height of structure 510. If multiple transmitters 118 appear on a map 100, the multi-path algorithm is preferably applied to each transmission path and the resulting areas are summed to identify the total multi-path area 504.

The ghost producing structures 510 used in the multi-path algorithm can be obtained from several databases, including the FCC Master File, an object database and the FAA Database for Obstructions. Preferably, the following structures from these databases are used in the multi-path algorithm:

1. Structures identified from the FCC Master File where antenna height above ground is 60 feet or higher, except for structures within 2 miles of a map television transmitter site. The FCC's master file is used to find tall buildings. Tall buildings tend to attract radio communications equipment. The master file has every radio license, including two-way radio, paging, television, radio, cellular, etc.
2. Buildings taller than 40 feet from an object database or the FAA Database for Obstructions.
3. Control towers taller than 40 feet from an object database or the FAA Database for Obstructions.
4. Towers taller than 60 feet from an object database or the FAA Database for Obstructions, except for entries within 2 miles of a map television transmitter site.
5. Cooling towers taller than 40 feet from an object database or the FAA Database for Obstructions.

6. Elevators taller than 40 feet from an object database or the FAA Database for Obstructions.
7. Tanks taller than 40 feet from an object database or the FAA Database for Obstructions.

F. Area Special Algorithm

The area special contour 114 defines an area where a single directional antenna can not be used because the transmitting stations are too far apart for the antenna to be aimed correctly. Outside the area defined by area special contour 114, a single directional antenna may be used because the angular separation is acceptable.

If a location within the area special contour 114 is in a yellow contour 116A, green contour 116B or a light green contour 116C, the antenna recommended for these contours 116 may be used. If, however, the location is in any other contour 116, an "area special" antenna is needed. Several manufacturers offer area special antennas to solve reception problems in such areas.

Figure 6:
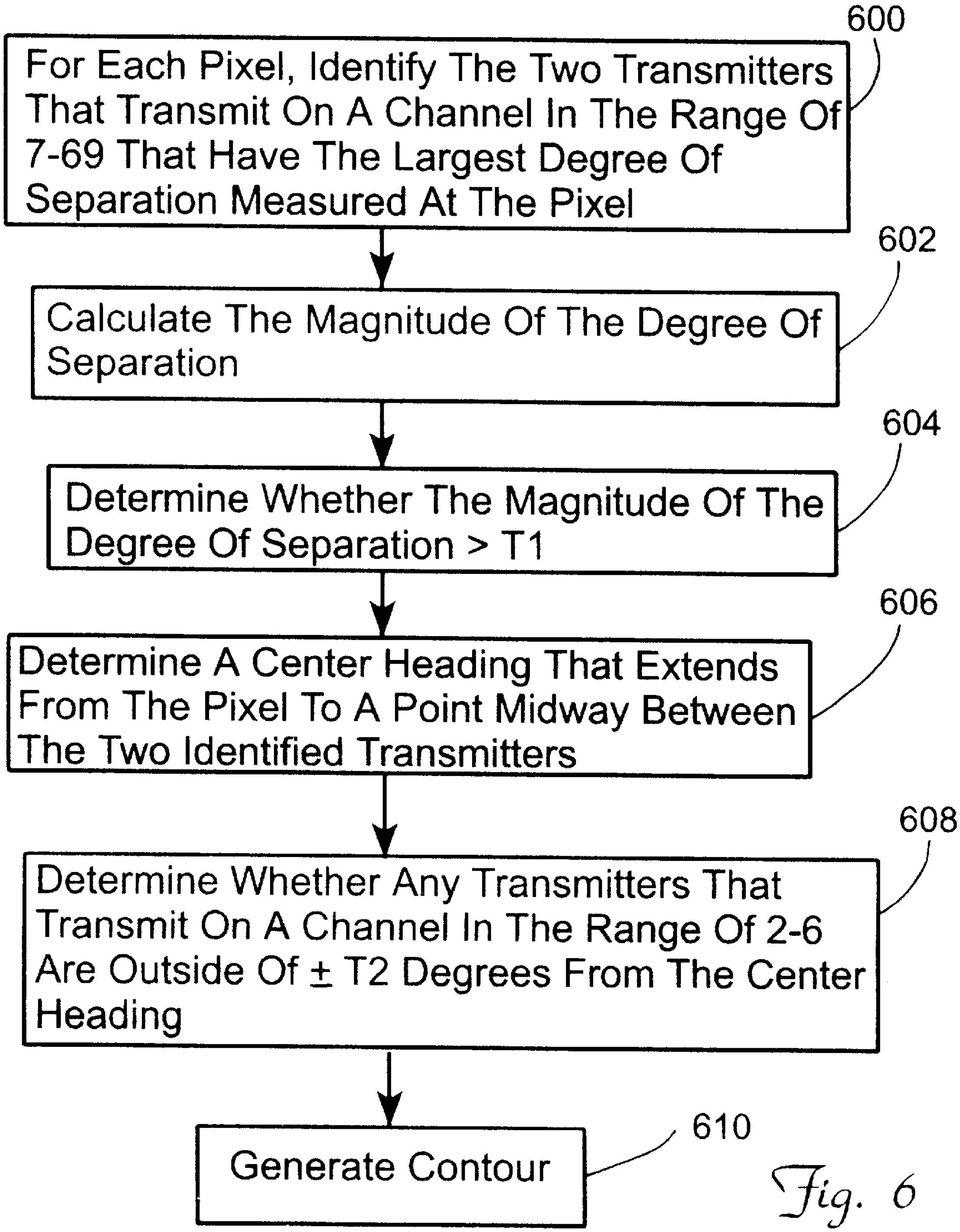
FIG. 6 shows a flow diagram of a preferred area special algorithm.

FIG. 6 shows a preferred algorithm for identifying the area special contour 114. For each pixel in the map 100, the two transmitters that transmit on a channel in the range of 7–69 and that have the largest degree of separation when viewed from the pixel are identified. (Block 600). The magnitude of the degree of separation between the two identified transmitters is calculated. (Block 602). It is determined whether the magnitude of the degree of separation is greater than T1, where T1 represents a threshold value that may vary from contour to contour. (Block 604). In a preferred embodiment, T1 is 45 degrees for pixels in yellow, green, light green, red or blue contours 116, and T1 is 30 degrees for pixels in violet or pink contours 116. A center heading is calculated, which is a line that extends from the pixel under examination to a point that is midway between the two identified transmitters. (Block 606). It is determined whether any transmitters that transmit on a channel in the range of 2–6 are outside of ±T2 degrees from the center heading with a vertex at the pixel under examination, where T2 represents a threshold value that may vary from contour to contour. (Block 608). In a preferred embodiment, T2 is 35 degrees for pixels in yellow, green, light green, red or blue (contours 116, and T2 is 30 degrees for pixels in violet or pink contours 116.

For any pixel, if the calculated magnitude of the degree of separation is greater than T1 (Block 604), or if any transmitters that transmit on a channel in the range of 2–6 are outside of ±T2 degrees from the center heading (Block 608), then the pixel is identified as an area special pixel. The last step in the area special algorithm is to generate the area special contour 114, which is a line connecting the outermost area special pixels. (Block 610).

The user-friendly maps generated in accordance with the techniques of the present invention assist purchasers in identifying the correct antenna for their location and situation. The invention takes multiple channels into account in generating each map to ensure adequate reception of all channels with the recommended antennas. The invention takes into account the effects of buildings and other large structures on television signal propagation, which increases the accuracy of signal strength calculations and antenna recommendations. Further, the maps of the present invention identify area special regions, which are areas where a directional antenna can not be used.

The techniques described herein for generating antenna recommendation maps may be implemented with a standard multi-purpose computer, or with specialized hardware and software that is dedicated to the task of generating such maps. The generated maps are preferably located in retail stores where antenna products are sold. The maps may be printed out and displayed at various locations in a store. Alternatively, the maps may be displayed using television screens, video kiosks or other computer-based display devices. Such alternative display devices preferably include user input devices that allow users to select an appropriate map, zoom in and out of a selected map to aid in the identification of the user's home, and access additional information such as "help" information. The maps of the present invention may also be stored on a server and accessed through a network such as the Internet. The antenna recommendation maps and the computer-based algorithms for generating the maps may also be stored on some portable media such as floppy disks and compact disks.

Alternatively, the techniques described herein may be used to provide antenna recommendations only for a particular location or set of coordinates, rather than an entire geographic area. For example, rather than having a user identify his or her home on an antenna recommendation map, a user may enter coordinates of his or her home or enter some other identifying information into a computer-based system, and have the system output the antenna recommendation for the user's home.

Although the present invention has been described with reference to preferred embodiments, workers skilled in the art will recognize that changes may be made in form and detail without departing from the spirit and scope of the invention.

What is claimed is:

1. A method of providing television antenna recommendations for a geographic area, the method comprising:

providing a set of terrain data representing the topography of the geographic area;

identifying a set of television channels being broadcast in the geographic area;

calculating a set of signal characteristics based on the identified set of television channels and the terrain data;

generating a map of the geographic area, the map including multiple contours based on the calculated set of signal characteristics such that each contour corresponds to a tape of antenna recommended for a geographic area bounded by that contour; and associating each contour with a recommended antenna type.

2. The method of claim 1 wherein the terrain data is supplemented with structure data representing man-made structures such as buildings, grain elevators and tanks, so that the structures are essentially made part of the terrain.

3. The method of claim 1 wherein the signal characteristics include signal strength of at least one television channel at various points in the geographic area.

4. The method of claim 3 wherein the signal characteristics include multi-path characteristics and signal blockage characteristics.

5. The method of claim 1 wherein the contours appear in a plurality of colors.

6. The method of claim 5 wherein the colored contours appear as substantially transparent overlays, so that underlying map data is visible.

7. The method of claim 1 wherein the contours appear with a plurality of types of cross-hatching.

8. The method of claim 1 wherein one of the contours corresponds to an area special region, indicating an area where a single directional antenna can not be used without a means of rotation.

9. The method of claim 1 wherein the map further comprises a channel list including television channels used in generating the map contours.

10. The method of claim 1 wherein the map further comprises a channel marker placed adjacent to a listed television channel to indicate the channel was not used in generating the map contours.

11. The method of claim 1 and further comprising an antenna selector guide attached to or otherwise in close association with the map, the antenna selector guide including conditional antenna recommendations, wherein the conditions are based at least in part on details not included in the map.

12. The method of claim 11 wherein at least one condition is based on structures such as buildings, steeples or towers.

13. The method of claim 1 and further comprising displaying the map on a display device.

14. The method of claim 1 wherein the association of contours with antenna types is provided by a map legend.

15. A method of providing television antenna recommendations for specific home locations in a geographic area, the method comprising:

receiving an input that specifies a home location in the geographic area;

providing a set of terrain data representing the topography of the geographic area;

identifying a set of television channels being broadcast in the geographic area, calculating a set of signal characteristics based on the identified set of television channels and the terrain data;

generating multiple contours based on the calculated set of signal characteristics such that each contour corresponds to a type of antenna recommended for a geographic area bounded by that contour; and generating an antenna recommendation for the specified home location based on the contour in which the home is located.

16. The method of claim 15 wherein the terrain data is supplemented with structure data representing man-made structures such as buildings, grain elevators and tanks, so that the structures are essentially made part of the terrain.

17. The method of claim 15 wherein the signal characteristics include signal strength of at least one television channel at various points in the geographic area.

18. The method of claim 17 wherein the signal characteristics include multi-path characteristics and signal blockage characteristics.

19. The method of claim 15 and further comprising displaying the antenna recommendation on a display device.

20. A system for creating a map for providing television antenna recommendations for a selected geographic area with a plurality of television channels, the system comprising:

a base map subdivided into a plurality of pixels means for predicting a signal strength for each channel at every pixel on the map;

means for determining terrain characteristics which will affect the predicted signal strength; and means for defining a contour on the base map based on the predicted signal strength of the channels and terrain characteristics affecting the predicted signal strength at every pixel, such that the contour bounds an area corresponding to a recommended television antenna.

21. The system of claim 20 wherein the means for predicting signal strength comprises the Longley-Rice algorithm.

22. The system of claim 20 wherein the means for predicting terrain characteristics comprises a United States Geological Survey database.

23. The system of claim 22 wherein the means for predicting terrain characteristics is augmented with a commercially available database.

24. The system of claim 20 wherein the means for defining a contour comprises defining a range of signal strengths associated with the contour.

25. The system of claim 24 wherein the means for defining a contour further comprises assigning a pixel to a particular contour based on the range into which the strength of the signals received in that pixel fall.

26. The system of claim 25 wherein the means for defining a contour further comprises: assigning a pixel to a first contour when there are no channels received at the pixel having a signal strength above −50 dBc, assigning a pixel to a second contour when one or more channels received at the pixel have a signal strength which is not above −50 dBc, and one or more other channels have a signal strength which is above −50 dBc, assigning a pixel to a third contour when the weakest station received at the pixel has a signal strength of about −50 to −20 dBc, assigning a pixel to a fourth contour when the weakest station received at the pixel has a signal strength of about −20 to 0 dBc, assigning a pixel to a fifth contour when the weakest station received at the pixel has a signal strength of about 0 to about 10 dBc, assigning a pixel to a sixth contour when the weakest station received at the pixel has a signal strength of 10 to 20 dBc, assigning a pixel to a seventh contour when the weakest station received at the pixel has a signal strength above 20 dBc.

27. The system of claim 26 wherein the means for defining a contour further comprises assigning a pixel to an eighth contour when the pixel was previously assigned to a first, second, or third contour, but a signal received at the pixel is obstructed or has interference.

28. The system of claim 27 wherein the means for defining a contour further comprises assigning a pixel to the eighth contour when the pixel was previously assigned to a fifth, sixth, or seventh contour, but a signal received at the pixel experiences ghosting.

29. The system of claim 27 wherein the means for defining a contour further comprises assigning a pixel to an area special region when the transmitting stations are too far apart for an antenna to be aimed correctly from that pixel.

* * * * *